(12) United States Patent
Zhou et al.

(10) Patent No.: US 12,438,166 B2
(45) Date of Patent: Oct. 7, 2025

(54) LARGE PROTON EXCHANGE MEMBRANE FUEL CELL POWER STATION PROCESS SYSTEM

(71) Applicant: ZHEJIANG UNION SKY TECHNOLOGY CO., LTD., Zhejiang (CN)

(72) Inventors: He Zhou, Zhejiang (CN); Fengman Zhou, Zhejiang (CN); Shujing Wan, Zhejiang (CN); Gang Zhou, Zhejiang (CN)

(73) Assignee: ZHEJIANG UNION SKY TECHNOLOGY CO., LTD., Zhejiang (CN)

( * ) Notice: Subject to any disclaimer, the term of this patent is extended or adjusted under 35 U.S.C. 154(b) by 545 days.

(21) Appl. No.: 17/782,160

(22) PCT Filed: Dec. 23, 2019

(86) PCT No.: PCT/CN2019/127321
§ 371 (c)(1),
(2) Date: Jun. 2, 2022

(87) PCT Pub. No.: WO2021/109278
PCT Pub. Date: Jun. 10, 2021

(65) Prior Publication Data
US 2023/0010307 A1    Jan. 12, 2023

(30) Foreign Application Priority Data

Dec. 4, 2019   (CN) .......................... 201911229622.0

(51) Int. Cl.
*H01M 8/043*    (2016.01)
*H01M 8/04029*  (2016.01)
(Continued)

(52) U.S. Cl.
CPC ... *H01M 8/04302* (2016.02); *H01M 8/04029* (2013.01); *H01M 8/04104* (2013.01);
(Continued)

(58) Field of Classification Search
CPC ......... H01M 8/04302; H01M 8/04029; H01M 8/04104; H01M 8/04126; H01M 8/04753;
(Continued)

(56) References Cited

U.S. PATENT DOCUMENTS

| | | | |
|---|---|---|---|
| 2012/0006607 A1* | 1/2012 | Ohashi | B60L 58/40 |
| | | | 180/65.31 |
| 2012/0015257 A1* | 1/2012 | Arisawa | B60K 1/04 |
| | | | 429/400 |

* cited by examiner

*Primary Examiner* — Raymond Alejandro
(74) *Attorney, Agent, or Firm* — LANWAY IPR SERVICES; Chun-Ming Shih

(57) ABSTRACT

A large-scale proton exchange membrane fuel cell power station process system includes a distributed cell stack module, a modular fuel supply system, a modular oxidant supply system, a modular cooling system, a power transmission and inverter system, and a power station master system. The distributed cell stack module is a power station core power generation device, the modular fuel supply system serves as a fuel supply system for the distributed cell stack module, and the modular oxidant supply system serves as an oxidant supply system for the distributed cell stack module; the modular cooling system performs cooling and heat exchange of the distributed cell stack module, the power transmission and inverter system converts, transmits and allocates a power of the distributed cell stack module, and the power station master system controls and manages each of the systems and the modules. The process system is unattended during peak electricity consumption.

8 Claims, 7 Drawing Sheets

(51) Int. Cl.
*H01M 8/04089* (2016.01)
*H01M 8/04119* (2016.01)
*H01M 8/04302* (2016.01)
*H01M 8/04746* (2016.01)
*H01M 8/04791* (2016.01)
*H01M 8/04828* (2016.01)
*H01M 8/04858* (2016.01)
*H01M 8/247* (2016.01)

(52) U.S. Cl.
CPC ... *H01M 8/04126* (2013.01); *H01M 8/04753* (2013.01); *H01M 8/04798* (2013.01); *H01M 8/04835* (2013.01); *H01M 8/04858* (2013.01); *H01M 8/247* (2013.01); *H01M 2250/10* (2013.01)

(58) Field of Classification Search
CPC ......... H01M 8/04798; H01M 8/04835; H01M 8/04858; H01M 8/247; H01M 2250/10
See application file for complete search history.

LARGE PROTON EXCHANGE MEMBRANE FUEL CELL POWER STATION PROCESS SYSTEM

FIELD OF THE INVENTION

The present invention relates to the technical field of fuel cell power station, in particular to a large-scale proton exchange membrane fuel cell power station process system.

BACKGROUND OF THE INVENTION

The power generated by proton exchange membrane fuel cell is a new type of clean energy with high conversion efficiency. Under the circumstance of increasing global energy shortage, fuel cells whose product is water has attracted more and more attention from international energy industries. With the development of scientific research and technology, fuel cell power stations occupy a small area and can be configured conveniently and flexibly with fast start-up and stable operation, and the high-current DC substation technology is mature. The process system based on this distributed fuel cell power station can not only solve the problem of long-distance power transmission that is commonly faced in the world, but also is a very environmentally friendly power generation technology.

In peak regulation and frequency regulation in power grid and in important backup power applications, the proton exchange membrane fuel cell power station can generally complete the start-up of the power station in 3-5 minutes, and achieve full-load power output. The output power of the fuel cell power station can be adjusted according to the power load. It has advantages of fast start-up, stable operation, low noise, small occupation, easy implementation, and flexible power adjustment can not only save the waste of power resources for users and the country, but also facilitate management, save energy and increase efficiency.

SUMMARY OF THE INVENTION

In view of the above problems existing in the prior art, the objectives of the present invention is to design and propose a technical scheme of a large-scale proton exchange membrane fuel cell power station process system. The power station process system provides electricity for users, and is unattended during peak power consumption. It can be connected with the grid dispatching system to balance the grid load.

The large-scale proton exchange membrane fuel cell power station process system includes a distributed cell stack module, a modular fuel supply system, a modular oxidant supply system, a modular cooling system, a power transmission and inverter system, and a power station master system. The distributed cell stack module is a power station core power generation device, the modular fuel supply system serves as a fuel supply system for the distributed cell stack module, and the modular oxidant supply system serves as an oxidant supply system for the distributed cell stack module; the modular cooling system performs cooling and heat exchange of the distributed cell stack module, the power transmission and inverter system converts, transmits and allocates a power of the distributed cell stack module, and the power station master system controls and manages each of the systems and the modules.

In one embodiment, the distributed cell stack module is formed by connecting a first cell stack module, a second cell stack module . . . and an Nth cell stack module, and each of the cell stack modules is formed by connecting N single cell stacks; the modular fuel supply system includes a low-pressure fuel buffer storage tank, the low-pressure fuel buffer storage tank is connected to a fuel supply main pipe, and the fuel supply main pipe is connected with main fuel inlets and main fuel outlets of the first cell stack module, the second cell stack module . . . and the Nth cell stack module of the distributed cell stack module through a first branch fuel supply branch pipe, a first branch fuel discharge branch pipe, a second branch fuel supply branch pipe, a second branch fuel discharge branch pipe . . . an Nth branch fuel supply branch pipe and an Nth branch fuel discharge branch pipe respectively.

In one embodiment, the modular oxidant supply system includes an air buffer heat exchanger, the air buffer heat exchanger is connected with an air compressor, and an air outlet of the air buffer heat exchanger is connected with an air inlet main pipe; the air inlet main pipe is connected with main air inlets of the first cell stack module, the second cell stack module . . . and the Nth cell stack module of the distributed cell stack module through a first air inlet branch pipe, a second air inlet branch pipe . . . and an Nth air inlet branch pipe respectively, and main air outlets of the first cell stack module, the second cell stack module . . . and the Nth cell stack module of the distributed cell stack module are connected with an exhaust main pipe through a first air outlet branch pipe, a second air outlet branch pipe . . . an Nth air outlet branch pipe respectively; the exhaust main pipe is connected with an air inlet of a third gas-water separator, and a first air outlet of the third gas-water separator is connected with a water collection container.

In one embodiment, the power transmission and inverter system includes a DC/DC conversion device, the DC/DC conversion device is connected with an inverter system, the inverter system is connected with a first transformer, and the first transformer merges an alternating current into a utility power main line; the first transformer is cooperatively connected with a second transformer, and the second transformer is connected with the power station master system.

In one embodiment, the single cell stack is press-fitted by servo pressure and sealing with a pressure plate, an upper end plate, an upper insulation plate, an upper current collector, an anode blind plate, a single battery pack formed by connecting N single cells, a cathode blind plate, a lower current collector, a lower insulation plate and a lower end plate that are arranged in sequence; the upper current collector is provided with an upper carbon paper, and the lower current plate is provided with a lower carbon paper; a side of the anode blind plate is provided with an anode current field, and a side of the cathode blind plate is provided with a cathode current field.

In one embodiment, the modular fuel supply system further includes a nitrogen storage tank and a fuel collection storage tank; the nitrogen storage tank is connected with a nitrogen supply main pipe, and the fuel collection storage tank is connected with a fuel collection main pipe; the nitrogen supply main pipe and the fuel collection main pipe are connected with a second air outlet of a first water-gas separator, a second air outlet of a second water-gas separator . . . and an Nth water-gas separator respectively after being connected with each other; a first air outlet of the first water-gas separator is connected with a first fuel circulation pump, the first fuel circulation pump is connected with the first branch fuel supply branch pipe, and an air inlet of the first water-gas separator is connected with the first branch fuel discharge branch pipe; a first air outlet of the second water-gas separator is connected with a second fuel circulation pump, the second fuel circulation pump is connected with the second branch fuel supply branch pipe, and an air inlet of the second water-gas separator is connected with the second branch fuel discharge branch pipe; the fuel supply main pipe is cooperatively provided with a first pressure gauge, a first stop valve, a first adjustment valve, and a first safety valve; the fuel supply main pipe is connected with the first branch fuel supply branch pipe, the first branch fuel discharge branch pipe, the second branch fuel supply branch pipe, the second branch fuel discharge branch pipe . . . the Nth branch fuel supply branch pipe and the Nth branch fuel discharge branch pipe through a first injection valve, a second injection valve . . . and an Nth injection valve respectively; the nitrogen supply main pipe is cooperatively provided with a second pressure gauge, a second stop valve and a second adjustment valve; the fuel collection main pipe is cooperatively provided with a third pressure gauge, a third stop valve and a third adjustment valve; a second air outlet of the first water-gas separator is connected with a third electric control valve and a fourth electric control valve; a second air outlet of the second water-gas separator is connected with a seventh electric control valve and an eighth electric control valve; the first fuel circulation pump is connected with a fourth adjustment valve and a first flow meter on the first branch fuel supply branch pipe, the other end of the fourth adjustment valve is connected with the first injection valve, the other end of the first flow meter is connected with the first electric control valve, and the first electric control valve is connected with the first cell stack module of the distributed cell stack module; the second fuel circulation pump is connected with a fifth adjustment valve and a second flow meter on the second branch fuel supply branch pipe, the other end of the fifth adjustment valve is connected with the second injection valve, the other end of the second flow meter is connected with a fifth electric control valve, and the fifth electric control valve is connected with the second cell stack module of the distributed cell stack module.

In one embodiment, the modular oxidant supply system further includes an air humidifier and an air filter; an end of the air humidifier is connected with the air buffer heat exchanger and the air inlet of the third gas-water separator through a first pipeline, and the other end of the air humidifier is connected with the air inlet main pipe and the exhaust main pipe; the air compressor is connected with the air filter through a second pipeline, and the second pipeline is provided with a third flow meter and a sixth adjustment valve; the first air inlet branch pipe is cooperatively provided with a fourth flow meter and a seventh adjustment valve, and the second air inlet branch pipe is cooperatively provided with a fifth flow meter and an eighth adjustment valve; the first air outlet branch pipe is cooperatively provided with a ninth electric control valve, and the second air outlet branch pipe is cooperatively provided with a tenth electric control valve; a third pipeline connected between the first air outlet of the third gas-water separator and the water collection container is provided with an eleventh electric control valve, and the second air outlet of the third gas-water separator is connected with a twelfth electric control valve.

In one embodiment, the modular cooling system includes a coolant water container, a circulating water cooling device cooperatively connected with the coolant water container, and a pure water processing device; a water delivery main pipe of the coolant water container is connected with main water inlets of the first cell stack module, the second cell stack module . . . and the Nth cell stack module of the distributed cell stack module through a first cooling water inlet branch pipe, a second cooling water inlet branch pipe . . . and an Nth cooling water inlet branch pipe respectively, and a water return main pipe the coolant water container is connected with main water outlets of the first cell stack module, the second cell stack module . . . and the Nth cell stack module of the distributed cell stack module through a first water outlet branch pipe, a second water outlet branch pipe . . . and an Nth water outlet branch pipe respectively; the pure water processing device is cooperatively connected with the water collection container of the modular oxidant supply system through a water replenish pipe.

In one embodiment, the water delivery main pipe is cooperatively provided with a fifteenth electric control valve, a circulating water pump and a twelfth adjustment valve, the first cooling water inlet branch pipe is cooperatively provided with the tenth adjustment valve, and the second cooling water inlet branch pipe is cooperatively provided with the eleventh adjustment valve; a first water outlet branch pipe is cooperatively provided with a thirteenth electric control valve, and the second water outlet branch pipe is cooperatively provided with a fourteenth electric control valve; the coolant water container is connected with a water return port of the air buffer heat exchanger of the modular oxidant supply system through a heat exchanger water return pipe, an water inlet of the air buffer heat exchanger is connected with the thirteenth adjustment valve, and the thirteenth adjustment valve is connected with the circulating water pump and the twelfth adjustment valve through first pipelines respectively; a second pipeline connected between the coolant water container and the circulating water cooling device is provided with an external circulating water pump, the coolant water container is connected with an inlet pipeline of the pure water processing device through a sixteenth electric control valve and a seventeenth electric control valve, and the water replenish pipe of the pure water processing device is cooperatively provided with an eighteenth electric control valve, a delivery pump, a stop valve and a check valve.

In one embodiment, the single cell is formed by a bipolar plate and membrane electrodes symmetrically arranged on both sides of the bipolar plate; the membrane electrode includes a proton exchange membrane, both sides of the proton exchange membrane are symmetrically provided with catalyst layers, both sides of the catalyst layer are symmetrically provided with gas diffusion layers, and the gas diffusion layers on both sides are sealed and combined with the bipolar plates on both sides to form the single cell; the single cell stack is provided with a voltage inspection plate, a fuel runner inlet, a coolant inlet, an oxidant runner inlet, a fuel runner outlet, a coolant outlet and an oxidant runner outlet, and the voltage inspection plate is controllably connected with the power station master system.

In the invention, the power output can be performed to one group or N groups in the power station according to the power load. When a certain cell stack module is shut down and expected to be maintained due to abnormality, the inlet and outlet of the cell stack pipeline are closed through the stop valve, which does not affect the normal power generation of other cell stacks, and avoids the reduction of efficiency in power generation of the cell stacks while prolonging the operating life of the power station.

In the invention, in order to ensure high power, continuous and stable current output, N cell stack modules are distributed in the power station system, the coolant ensures a stable working temperature inside the cell stack, and the returned water of the coolant can be used for heat exchange through external cooling circulating water, which can be used for heating or domestic water, or dissipate heat through cooling towers and air cooling.

In the invention, the air pipeline in the fuel cell power station process system collects and stores the pure water produced by the power station through the water-gas separator for facilitating the replenishment of the external circulating water to ensure adequate supply of coolant through subsequent water treatment equipment, which is especially important in remote mountainous areas or areas with limited water resources. In low temperature areas in winter, the thermal energy generated by the power station itself can be used to control the fuel or coolant at a constant temperature, which not only saves water resources, but also reduces the energy consumption of fans and pumps.

In the invention, the potential safety hazards are fully considered, the cell stack modules ensure good ventilation, and the front-end air supply and water supply treatment systems are arranged in one container while the cell stack modules are centrally arranged in the other container; the inverter system is isolated from the first two systems nearby, and a fuel detection apparatus is installed above the cell stack container; each container has standardized safety distance, safety grounding and lightning protection measures, and the containers are equipped with apparatuses related to such as temperature, humidity, emergency stop, real-time detection to ensure the stable operation of the power station.

The above large-scale proton exchange membrane fuel cell power station process system has various systems such as a modular fuel supply system, an oxidant supply system and a water supply system, which ensures the continuous and stable operation of the power output of the power station. When a certain module cell stack needs maintenance due to abnormality, it does not affect the overall power output, and after the maintenance is completed, it is put into operation. The total power output threshold can be managed and controlled by starting and stopping the number of cell stack modules or adjusting the percentage of power generation efficiency. The by-product water of the power station can solve the water shortage problem of the power station system, and the by-product gas can be used to collect heat energy through the heat exchanger for the system of the power station that requires constant temperature. At the same time, it can be used for domestic water and heating in winter. The process system of this power station adopts a modular layout, which occupies a small area, is easy to implement, and has low noise, wherein the software system is safe and easy to manage, and can be unattended.

BRIEF DESCRIPTION OF THE DRAWINGS

Upon reading the following detailed description of preferred embodiments, various advantages and benefits will be apparent to those of ordinary skill in the art. The drawings are for the purpose of explaining preferred embodiments only, and do not constitute improper limitations on the present invention. The same components are also denoted by the same reference numerals throughout the drawings. In the drawings.

DESCRIPTION OF THE PREFERRED EMBODIMENTS

Figure 1:
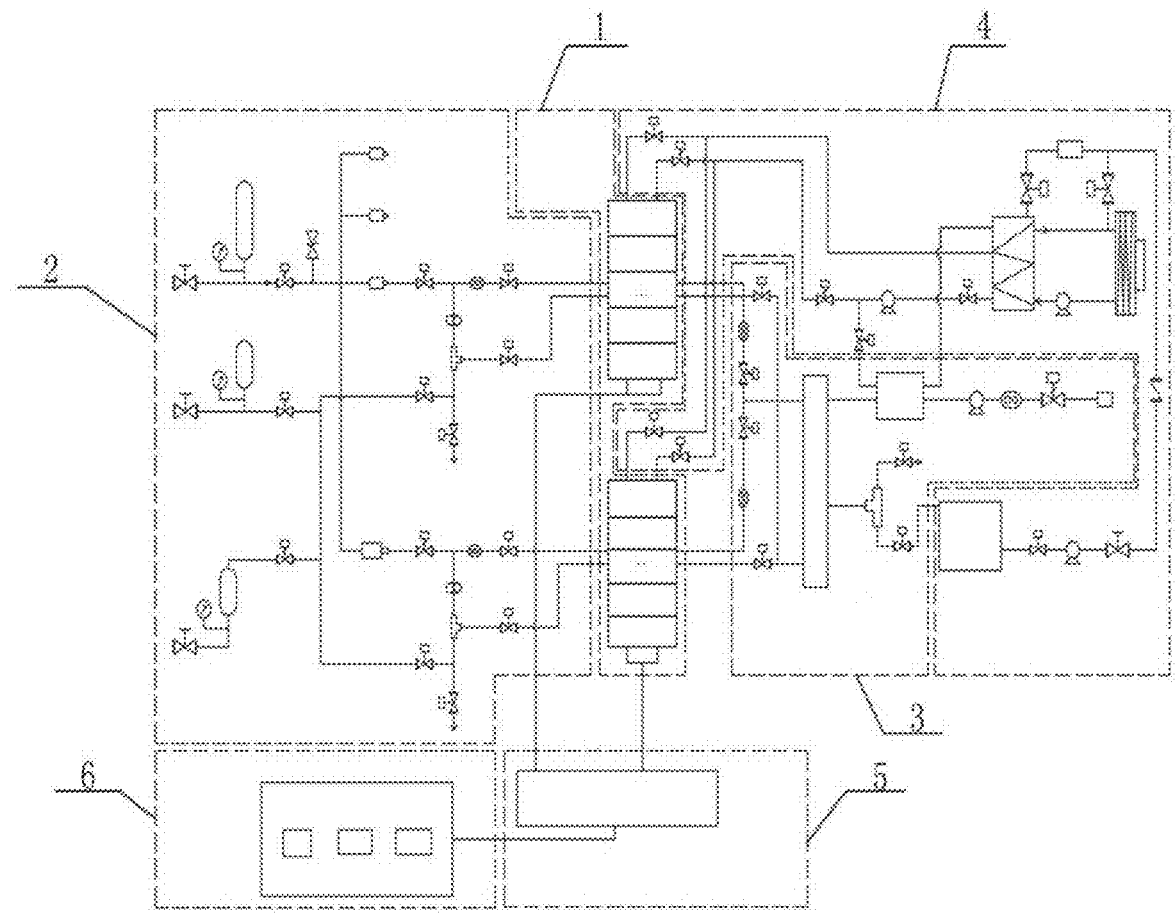
FIG. 1 is a structural block diagram of the invention.

The invention will be further described below with reference to the accompanying drawings and specific embodiments of the description, so as to make the technical problems, technical solutions and advantages to be solved by the invention more clear.

As shown, a large-scale proton exchange membrane fuel cell power station process system includes a distributed cell stack module 1, a modular fuel supply system 2, a modular oxidant supply system 3, a modular cooling system 4, a power transmission and inverter system 5, and a power station master system 6, wherein the distributed cell stack module 1 is a power station core power generation device, the modular fuel supply system 2 serves as a fuel supply system for the distributed cell stack module 1, and the modular oxidant supply system 3 serves as an oxidant supply system for the distributed cell stack module 1. The modular cooling system 4 performs cooling and heat exchange of the distributed cell stack module 1, the power transmission and inverter system 5 converts, transmits and allocates a power of the distributed cell stack module 1, and the power station master system 6 controls and manages each of the systems and the modules.

Figure 2:
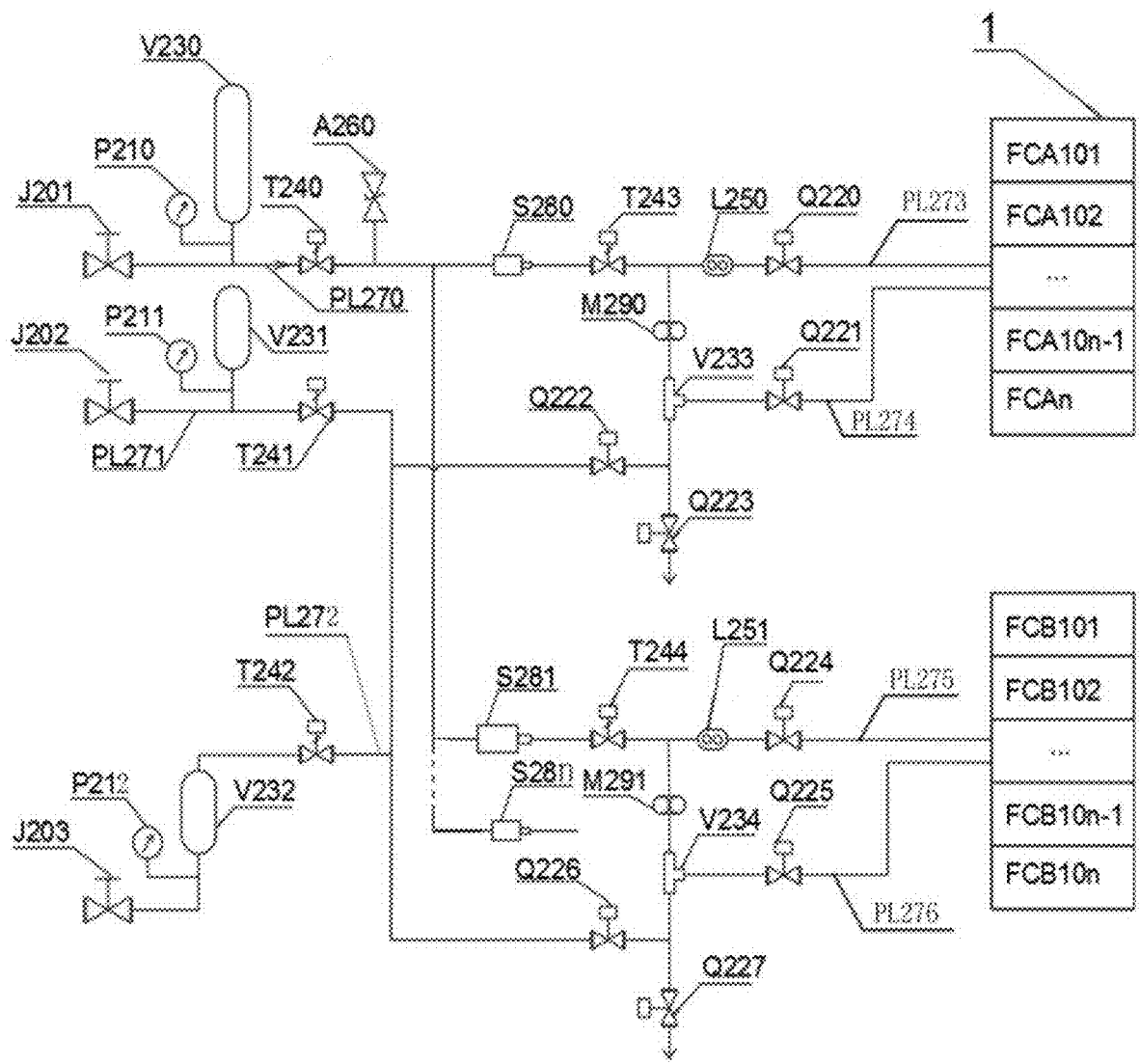
FIG. 2 is a structural diagram of a modular fuel supply system of the invention.
Figure 3:
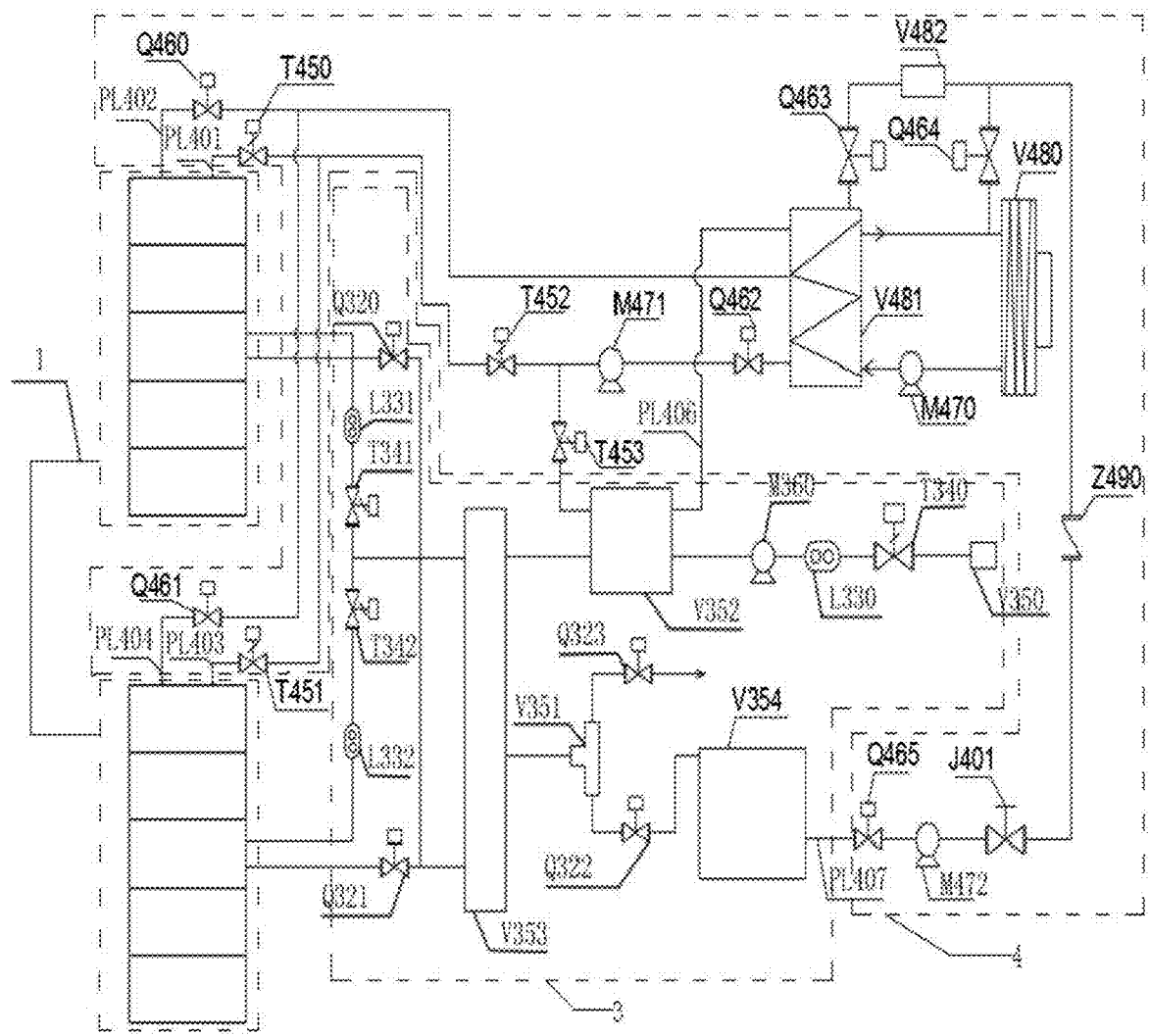
FIG. 3 is a structural diagram of a modular oxidant supply system and a modular cooling system of the invention.
Figure 4:
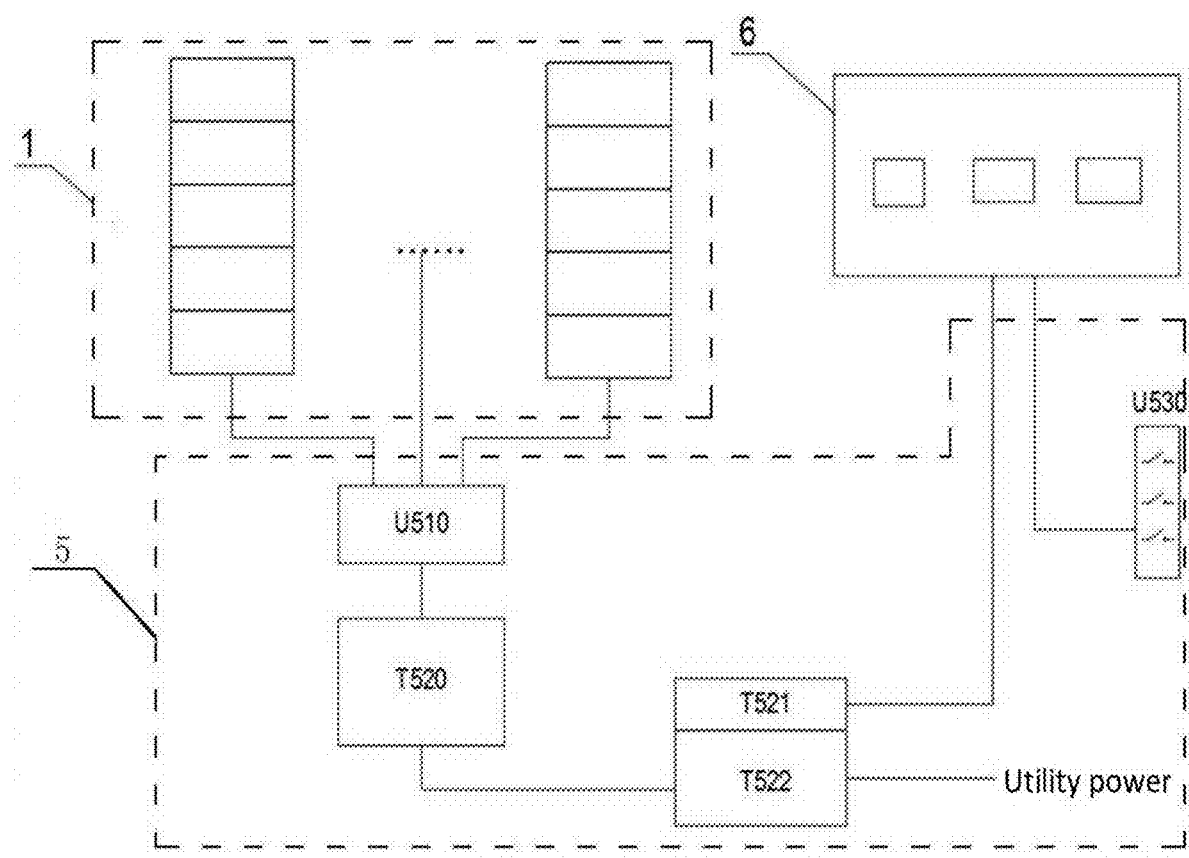
FIG. 4 is a structural diagram of a power transmission and inverter system of the invention.
Figure 5:
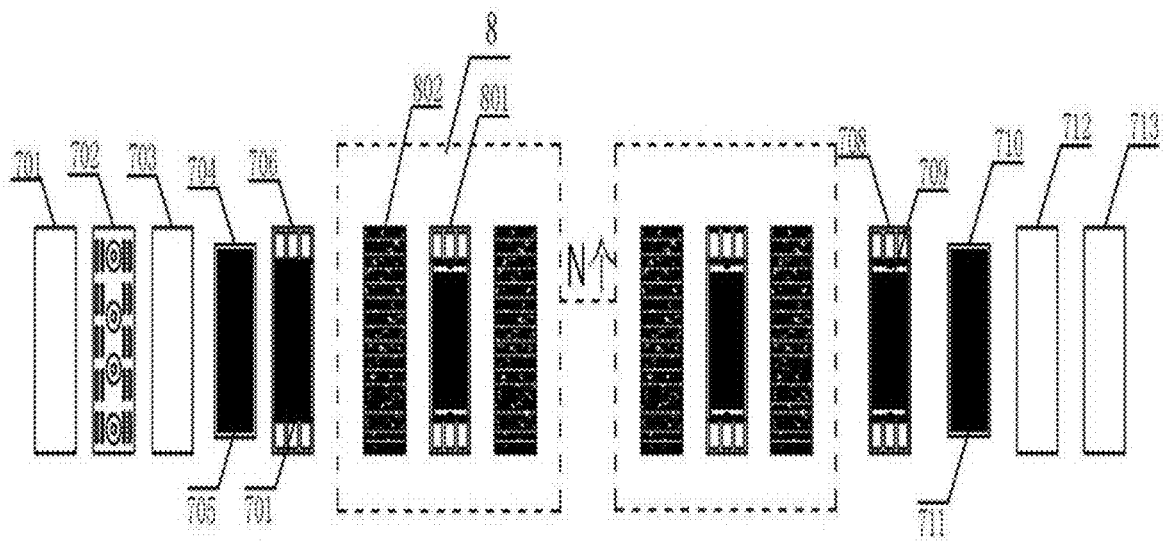
FIG. 5 is a split structural diagram of a single cell stack in a distributed cell stack module of the invention.
Figure 6:
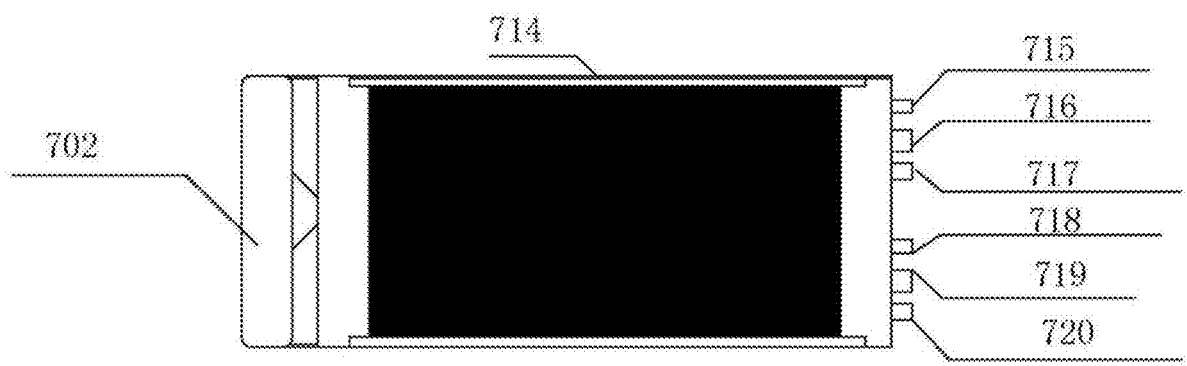
FIG. 6 is a combined diagram of the single cell stack in the distributed cell stack module of the invention.
Figure 7:
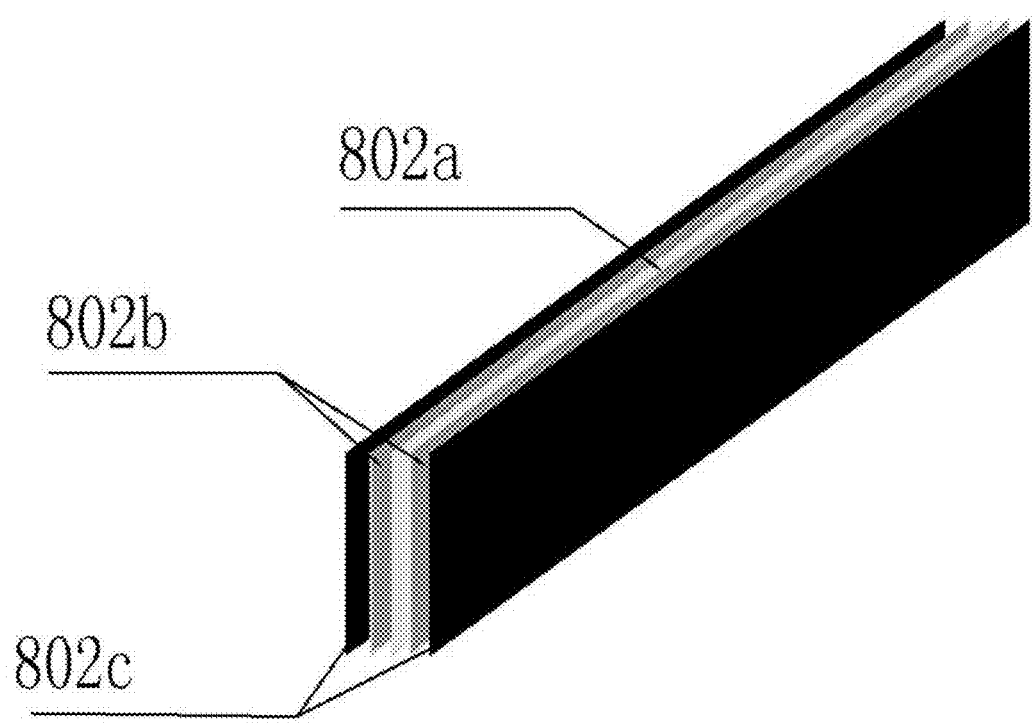
FIG. 7 is a structural diagram of a membrane electrode in the distributed cell stack module of the invention.
Figure 8:
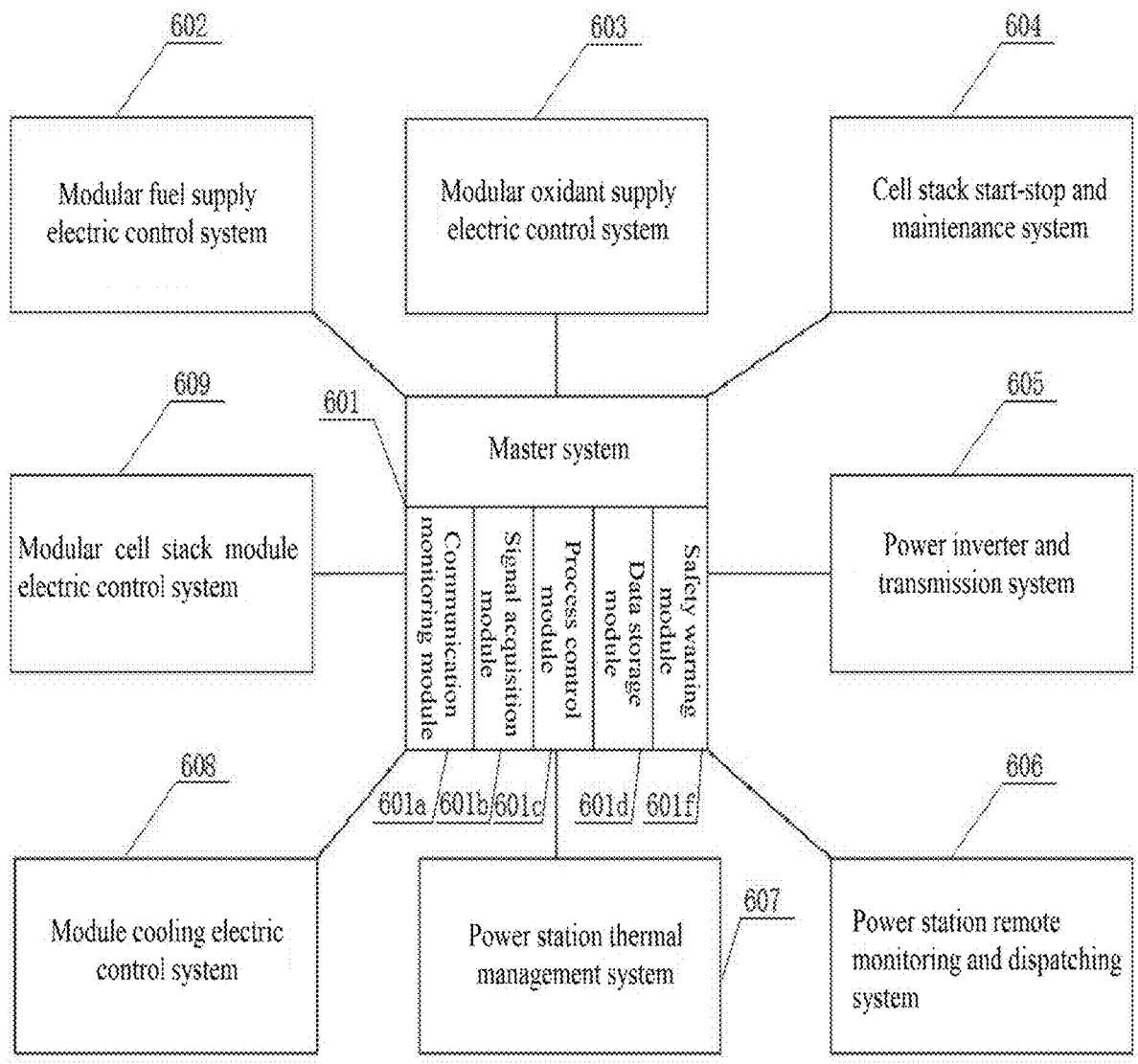
FIG. 8 is a structural diagram of a master system of the power station of the invention.

Further, the distributed cell stack module 1 is formed by connecting a first cell stack module, a second cell stack module . . . and an Nth cell stack module, and each of the cell stack modules is formed by connecting N single cell stacks 7. In FIG. 2, only two cell stack modules are schematically illustrated here. As shown in the upper part of FIG. 2, the cell stack modules shown by FC101A, FC102A . . . FCnA are composed of N single cell stacks 7. As shown in the lower part of FIG. 2, the cell stack modules shown by FC101B, FC102B . . . FCnB are composed of N single cell stacks 7. The cell stack module may not only operate independently, but also operate in any combination mode when the fuel is transported through the modular process pipeline in the power station, and the abnormal shutdown or maintenance of the power station does not affect the normal operation of other modules. The single cell stack 7 is press-fitted by servo pressure and sealing with a pressure plate 701, an upper end plate 702, an upper insulation plate 703, an upper current collector 704, an anode blind plate 706, a single battery pack formed by connecting N single cells 8, a cathode blind plate 708, a lower current collector 709, a lower insulation plate 712 and a lower end plate 713 that are arranged in sequence. The upper current collector 704 is provided with an upper carbon paper 705, and the lower current plate 710 is provided with a lower carbon paper 711. A side of the anode blind plate 706 is provided with an anode current field 707, and a side of the cathode blind plate 708 is provided with a cathode current field 709. Further, the single cell 8 is formed by a bipolar plate 801 and membrane electrodes 802 symmetrically arranged on both sides of the bipolar plate. The membrane electrode 802 includes a proton exchange membrane 802a, both sides of the proton exchange membrane 802a are symmetrically provided with catalyst layers 802b, both sides of the catalyst layer 802b are symmetrically provided with gas diffusion layers 802c, and the gas diffusion layers 802c on both sides are sealed and combined with the bipolar plates 801 on both sides to form the single cell. The single cell stack 7 is provided with a voltage inspection plate 714, a fuel runner inlet 715, a coolant inlet 716, an oxidant runner inlet 717, a fuel runner outlet 718, a coolant outlet 719 and an oxidant runner outlet 720, and the voltage inspection plate 714 is controllably connected with the power station master system 6.

The modular fuel supply system 2 includes a low-pressure fuel buffer storage tank V230, the low-pressure fuel buffer storage tank V230 is connected to a fuel supply main pipe PL270, and the fuel supply main pipe PL270 is connected with main fuel inlets and main fuel outlets of the first cell stack module, the second cell stack module . . . and the Nth cell stack module of the distributed cell stack module 1 through a first branch fuel supply branch pipe PL273, a first branch fuel discharge branch pipe PL274, a second branch fuel supply branch pipe PL275, a second branch fuel discharge branch pipe PL276 . . . an Nth branch fuel supply branch pipe and an Nth branch fuel discharge branch pipe respectively. Moreover, the modular fuel supply system 2 further includes a nitrogen storage tank V231 and a fuel collection storage tank V232. The nitrogen storage tank V231 is connected with a nitrogen supply main pipe PL271, and the fuel collection storage tank V232 is connected with a fuel collection main pipe PL272. The nitrogen supply main pipe PL271 and the fuel collection main pipe PL272 are connected with a second air outlet of a first water-gas separator V233, a second air outlet of a second water-gas separator V234 . . . and an Nth water-gas separator respectively after being connected with each other. A first air outlet of the first water-gas separator V233 is connected with a first fuel circulation pump M290, the first fuel circulation pump M290 is connected with the first branch fuel supply branch pipe PL273, and an air inlet of the first water-gas separator V233 is connected with the first branch fuel discharge branch pipe PL274. A first air outlet of the second water-gas separator V234 is connected with a second fuel circulation pump M291, the second fuel circulation pump M291 is connected with the second branch fuel supply branch pipe PL275, and an air inlet of the second water-gas separator V234 is connected with the second branch fuel discharge branch pipe PL276. The fuel supply main pipe PL270 is cooperatively provided with a first pressure gauge P210, a first stop valve J201, a first adjustment valve T240, and a first safety valve A260. The fuel supply main pipe PL270 is connected with the first branch fuel supply branch pipe PL273, the first branch fuel discharge branch pipe PL274, a second branch fuel supply branch pipe PL275, a second branch fuel discharge branch pipe PL276 . . . the Nth branch fuel supply branch pipe and the Nth branch fuel discharge branch pipe through a first injection valve S280, a second injection valve S281 . . . and an Nth injection valve respectively. The nitrogen supply main pipe PL271 is cooperatively provided with a second pressure gauge P211, a second stop valve J202 and a second adjustment valve T241. The fuel collection main pipe PL272 is cooperatively provided with a third pressure gauge P212, a third stop valve J203 and a third adjustment valve T242. A second air outlet of the first water-gas separator V233 is connected with a third electric control valve Q222 and a fourth electric control valve Q223. A second air outlet of the second water-gas separator V234 is connected with a seventh electric control valve Q226 and an eighth electric control valve Q227. The first fuel circulation pump M290 is connected with a fourth adjustment valve T243 and a first flow meter L250 on the first branch fuel supply branch pipe PL273, the other end of the fourth adjustment valve T243 is connected with the first injection valve S280, the other end of the first flow meter L250 is connected with the first electric control valve Q220, and the first electric control valve Q220 is connected with the first cell stack module of the distributed cell stack module 1. The second fuel circulation pump M291 is connected with a fifth adjustment valve T244 and a second flow meter L251 on the second branch fuel supply branch pipe PL275, the other end of the fifth adjustment valve T244 is connected with the second injection valve S281, the other end of the second flow meter L251 is connected with a fifth electric control valve Q224, and the fifth electric control valve Q224 is connected with the second cell stack module of the distributed cell stack module 1. In the system, the first pressure gauge P210 is used to monitor the pressure of the fuel pipelines, the first adjustment valve T240 is used to regulate the fuel flow, and the first safety valve A260 is used for safe pressure relief when the fuel is abnormal. The first injection valve S280 and the second injection valve S281 are used to adjust the pressure of the branch pipeline, and the mechanism also has an on-off and cut-off function. The fourth adjustment valve T243, the first flow meter L250, the fifth adjustment valve T244 and the second flow meter L251 are used to detect the fuel flow of the cell stack module in real time, and feed it back to the master control system 6 of the power station in real time. The third electric control valve Q222 and the fifth electric control valve Q224 are used for abnormally cutting off fuel supply during the power output. When the system monitors that the fuel exhaust concentration of a certain cell stack module is too high, it will control the circulating fuel pump through PWM pulse width modulation, thereby improving the utilization rate of fuel. The second air outlets of the first water-gas separator V233 and the second water-gas separator V234 are connected with the fourth electric control valve Q223 and the eighth electric control valve Q227 respectively, and the fourth electric control valve Q223 and the eighth electric control valve Q227 mainly exhaust the fuels with a small concentration difference. The third pressure gauge P213 monitors the pressures of the storage container and the pipelines, and the third stop valve J203 is used for exhaust or blowdown. When the cell stack system stops generating electricity or shuts down abnormally, the system pre-sets a program for gas recovery and purging to ensure that the cell stack module is in a good and controllable safe environment, which is convenient for later maintenance. The second pressure gauge P211 monitors the nitrogen pressure, and the second stop valve J202 is used for blowdown or nitrogen supply. When the system is shut down and the fuel recovery is completed, according to the pressure value set inside the cell stack, the fuel inlet valve is closed at this time, and the second nitrogen adjustment valve T241, the third electric control valve Q222 or the seventh electric control valve Q226 are opened while opening the fuel circulating pump, so that the air inlet and the air outlet pipelines of the cell stack are unobstructed. When the pressure reaches a state where the nitrogen electric control valve T241 should be closed, the cell stack module ensures that it is in a good environment during shutdown under the real-time monitoring of the gas protection system, which is helpful for the normal and rapid start of the power station.

Further, the modular oxidant supply system 3 includes an air buffer heat exchanger V352, the air buffer heat exchanger V352 is connected with an air compressor M360, and an air outlet of the air buffer heat exchanger V352 is connected with an air inlet main pipe PL305. The air inlet main pipe PL305 is connected with main air inlets of the first cell stack module, the second cell stack module . . . and the Nth cell stack module of the distributed cell stack module 1 through a first air inlet branch pipe PL301, a second air inlet branch pipe PL303 . . . and an Nth air inlet branch pipe respectively, and main air outlets of the first cell stack module, the second cell stack module . . . and the Nth cell stack module of the distributed cell stack module 1 are connected with an exhaust main pipe PL306 through a first air outlet branch pipe PL302, a second air outlet branch pipe PL304 and an Nth air outlet branch pipe respectively. The exhaust main pipe PL306 is connected with an air inlet of a third gas-water separator V351, and a first air outlet of the third gas-water separator V351 is connected with a water collection container V354. In the system, at the same time when the modular fuel supply system 2 starts to run, the air compressor M360 in the modular oxidant supply system 3 runs. The inlet of the air compressor M360 is connected to the third flow meter L330 to monitor the air inlet volume, the sixth adjustment valve T340 is connected with the third flow meter L330 to adjust the gas volume, and the air filter V350 is connected with the sixth adjustment valve T340 to filter the dust. The air buffer heat exchanger V352 is connected to the air compressor M360 to adjust the air temperature in real time through temperature and pressure signals. The air humidity is adjusted according to the real-time calculation of the voltage, current and internal resistance system of the single cells of the cell stack. The air outlet of the air humidifier V353 is connected with the air inlet main pipe PL305, and the air inlet main pipe PL305 is respectively connected with the seventh adjustment valve T341 and the eighth adjustment valve T342. Then, with the combination of the fourth flow meter L331 and the fifth flow meter L332, the oxidant inlet volume of each cell stack module is adjusted. The tenth electric control valve Q321 and the ninth electric control valve Q320 control the discharge of waste gas and water from the cell stack module, and collect them through the exhaust main pipe PL306 to introduce them into the inlet of the air humidifier V353. The air humidifier V353 is adjusted by the system to humidify the fuel. The water produced by the cell stack module flows out from the bypass, flows out from the exhaust pipe, and enters the inlet of the third gas-water separator V351. Then, the gas and the water are separated, wherein the light air is discharged from the top of the third gas-water separator to be discharged by the twelfth electric control valve Q323, so as to conduct heat exchange and maintain the set temperature of the cell stack module system. For the water collected by the third gas-water separator V351, the water collection container V354 is proved with a liquid level detection to control whether the water flows into the water collection container V354 through the twelfth electric control valve Q323, so as to obtain energy, balance the heat energy required by other process pipelines of the power station and save the energy consumption of the power station itself.

Further, the power transmission and inverter system 5 includes a DC/DC conversion device U510, the DC/DC conversion device U510 is connected with an inverter system T520, the inverter system T520 is connected with a first transformer T522, and the first transformer T522 merges an alternating current into a utility power main line. The first transformer T522 is cooperatively connected with a second transformer T521, and the second transformer T521 is connected with the power station master system 6. The master control system 6 of the power station is cooperatively connected with a master switch U530 of a backup power, and the power station system has an early warning on the threshold of the capacitors. The master switch U530 of the backup power is automatically closed to charge the capacitor, and when the system is running stably, the master switch U530 is disconnected. When the cell stack process module is put into operation, the DC current flows out, the current and voltage signals are fed back to the power inverter transmission control system, the closing switch is closed, the current enters the DC/DC conversion device U510, and the high-frequency switching action is performed through the controllable switch (MOSFET, etc.) to store the input electric energy in the capacitor (inductor). When the switch is turned off, the electric energy releases energy again, then the frequency is modulated by the control unit of the inverter system T520, and the DC direct current is inverted into high-frequency high-voltage alternating current through the inverter bridge, the control logic and the filter circuit, followed by merging into utility power main line stably by increasing and decreasing voltages through the transformer T522. When the voltage is unstable, the system will issue a notification and automatically disconnect. The transformer T521 is used for power supply of the AC load of the power station, and the transformer T521 is connected to the power station master system 6. Priority is given to meeting the power load of the power station.

Further, the modular oxidant supply system 3 further includes an air humidifier V353 and an air filter V350. An end of the air humidifier V353 is connected with the air buffer heat exchanger V352 and the air inlet of the third gas-water separator V351 through pipelines, and the other end of the air humidifier V353 is connected with the air inlet main pipe PL305 and the exhaust main pipe PL306. The air compressor M360 is connected with the air filter V350 through pipelines, and the pipeline is provided with a third flow meter L330 and a sixth adjustment valve T340. The first air inlet branch pipe PL301 is cooperatively provided with a fourth flow meter L331 and a seventh adjustment valve T341, and the second air inlet branch pipe PL303 is cooperatively provided with a fifth flow meter L332 and an eighth adjustment valve T342. The first air outlet branch pipe PL302 is cooperatively provided with a ninth electric control valve Q320, and the second air outlet branch pipe PL304 is cooperatively provided with a tenth electric control valve Q321. A pipeline connected between the first air outlet of the third gas-water separator V351 and the water collection container V354 is provided with an eleventh electric control valve Q322, and the second air outlet of the third gas-water separator V351 is connected with a twelfth electric control valve Q323.

Further, the modular cooling system 4 includes a coolant water container V481, a circulating water cooling device V480 cooperatively connected with the coolant water container, and a pure water processing device V482; a water delivery main pipe PL406 of the coolant water container V481 is connected with main water inlets of the first cell stack module, the second cell stack module . . . and the Nth cell stack module of the distributed cell stack module 1 through a first cooling water inlet branch pipe PL401, a second cooling water inlet branch pipe PL403 . . . and an Nth cooling water inlet branch pipe respectively, and a water return main pipe PL405 the coolant water container V481 is connected with main water outlets of the first cell stack module, the second cell stack module . . . and the Nth cell stack module of the distributed cell stack module 1 through a first water outlet branch pipe PL402, a second water outlet branch pipe PL404 . . . and an Nth water outlet branch pipe respectively. The pure water processing device V482 is cooperatively connected with the water collection container V354 of the modular oxidant supply system 3 through a water replenish pipe PL407. More further, the water delivery main pipe PL406 is cooperatively provided with a fifteenth electric control valve Q462, a circulating water pump M471 and a twelfth adjustment valve T452, the first cooling water inlet branch pipe PL401 is cooperatively provided with the tenth adjustment valve T450, and the second cooling water inlet branch pipe PL403 is cooperatively provided with the eleventh adjustment valve T451. A first water outlet branch pipe PL402 is cooperatively provided with a thirteenth electric control valve Q460, and the second water outlet branch pipe PL404 is cooperatively provided with a fourteenth electric control valve Q461. The coolant water container V481 is connected with a water return port of the air buffer heat exchanger V352 of the modular oxidant supply system 3 through a heat exchanger water return pipe PL406, an water inlet of the air buffer heat exchanger V352 is connected with the thirteenth adjustment valve T453, and the thirteenth adjustment valve T453 is connected with the circulating water pump M471 and the twelfth adjustment valve T452 through pipelines respectively. A pipeline connected between the coolant water container V481 and the circulating water cooling device V480 is provided with an external circulating water pump M470, the coolant water container V481 is connected with pipelines of the pure water processing device V482 through a sixteenth electric control valve Q463 and a seventeenth electric control valve Q464, and the water replenish pipe PL407 of the pure water processing device V482 is cooperatively provided with an eighteenth electric control valve Q465, a delivery pump M472, a stop valve J401 and a check valve Z490. The modular cooling system 4 plays a key role in the entire power station, stabilizing the heat balance when working inside the cell stack, first for the water in the coolant water container V481; with the operation of the cell stack, the fifteenth electric control valve Q462 is opened, and the circulating water pump M471 adjusts the water pressure in real time through the feedback of the temperature and pressure of the inlet and outlet of the cell stack. The fifteenth electric control valve T452 controls the on-off of the coolant main PL425 of the cell stack, and the tenth adjustment valve T450 and the eleventh adjustment valve T451 respectively control the flow rate and on-off of the inlet of the coolant of each cell stack module. Further, the thirteenth electric control valve Q460 and the fourteenth electric control valve Q461 control the on-off of the water intake of the cell stack. The water return main pipe PL405 drains the water into the coolant water container V481, the outlet of the circulating water pump M471 sends the water to the air buffer heat exchanger V352 through the circulating water pump T453, and then drains the water into the coolant water container V481 through the heat exchanger water return pipe PL406. Further, the coolant water container V481 is provided with heat exchange functions. The temperature of the water return inside the cell stack is generally stable at 60-80°, which may make the cell stack in an optimal operating environment. Therefore, the temperature of the water in the coolant water container V481 requires an external circulating water cooling device V480 to flow the external circulating water through the external circulating water pump M470, and the heat of the coolant is taken away. The coolant and the external circulating water need to be replenished by water collection container V354. The water replenish pipe PL407 drains the water to the inlet of the delivery pump M472 through the eighteenth electric control valve Q465, and the stop valve J401 is normally open; when the system detects that water needs to be replenished, the seventeenth electric control valve Q464 is turned on, and the delivery pump M472 is turned on; when the external circulating water is running, the water level reaches and the system stops automatically. When the coolant needs to be replenished, the system turns on the pure water processing device V482 to ensure that the water quality meets the requirements, then the sixteenth electric control valve Q463 to make the water level reach, and then the water supply stops. At this time, the pure water processing device will also be on standby, and the check valve Z490 protects the piping system.

The power station master system 6 of the invention includes a master system 601 and a subsystem. The master system 601 belongs to the core control system of the power station operation, and includes a communication monitoring module 601a, a signal acquisition module 601b, a process control module 601c, a data storage module 601d and a safety warning module 601f. The subsystem includes a modular fuel supply electric control system 602, a modular oxidant supply electric control system 603, a cell stack start-stop and maintenance system 604, a power inverter and transmission system 605, a power station remote monitoring and dispatching system 606, a power station thermal management system 607, a module cooling electric control system 608 and a modular cell stack module electric control system 609. The modular cell stack module electric control system 609 is mainly responsible for monitoring and collecting voltage values of the cell stack, and calculating real-time information such as an actual division current, a total current and an internal resistance through system software. The modular fuel supply electric control system 602 is mainly responsible for the actions of the sensors and actuators of each module fuel circuit. The cell stack start-stop and maintenance system 604 is mainly a set of sub-control systems that automatically run the software in the background, such as normal shutdown and abnormal shutdown of the cell stack. The modular oxidant supply electric control system 603 is responsible for the control of the oxidant supply pressure, flow and execution devices of each cell stack module, and is interlocked with the modular fuel supply electric control system. The module cooling electric control system 608 is responsible for the internal temperature of each cell stack module in the entire power station, and ensures that the cell stack is at a working ambient temperature below 80° in real time. The power station thermal management system 607 mainly collects and utilizes the water and gas produced by the power station system. During the operation of the power station, the power inverter and transmission system 605 ensures safe and efficient power output, especially stable operation in special climates such as rain and snow. The power station remote monitoring and dispatching system 606 is a software system that is mainly responsible for the intelligent coordination of the national grid for power transmission during peak and valley power. Through remote monitoring, the power generation and abnormal conditions of the power station may be understood in real time, which is convenient for the allocation of power resources of the entire power grid. The master system 601 has real-time monitoring of various abnormal conditions by operating the machine, real-time storage of data, and priority control over the control background software of each subsystem. Once abnormal conditions occur, the system will issue warnings of different levels, with GPS positioning, remote fault diagnosis and authority management and interfaces. It realizes online monitoring of the real-time operation status of the power generation system of each cell stack module.

For the proton exchange membrane fuel cell power station process system in the invention, the potential safety hazards are fully considered, the cell stack modules ensure good ventilation, and the front-end air supply and water supply treatment systems are arranged in one container while the cell stack modules are centrally arranged in the other container. The inverter system is isolated from the first two systems nearby, and a fuel detection device is installed above the cell stack container; each container has standardized safety distance, safety grounding and lightning protection measures, and the containers are equipped with devices related to such as temperature, humidity, emergency stop, real-time detection to ensure the stable operation of the power station.

In the invention, the large-scale proton exchange membrane fuel cell power station process system has various systems such as a modular fuel supply system, an oxidant supply system and a water supply system, which ensures the continuous and stable operation of the power output of the power station. When a certain module cell stack needs maintenance due to abnormality, it does not affect the overall power output, and after the maintenance is completed, it is put into operation. The total power output threshold can be managed and controlled by starting and stopping the number of cell stack modules or adjusting the percentage of power generation efficiency. The by-product water of the power station can solve the water shortage problem of the power station system, and the by-product gas can be used to collect heat energy through the heat exchanger for the system of the power station that requires constant temperature. At the same time, it can be used for domestic water and heating in winter. The process system of this power station adopts a modular layout, which occupies a small area, is easy to implement, and has low noise, wherein the software system is safe and easy to manage, and can be unattended.

Taking the above ideal embodiments according to the invention as inspiration, and through the above description, relevant personnel can make various changes and modifications without departing from the technical idea of the invention. The technical scope of the invention is not limited to the contents in the specification, and the technical scope must be determined according to the scope of the claims.

What is claimed is:

1. A large-scale proton exchange membrane fuel cell power station process system, comprising a distributed cell stack module (1), a modular fuel supply system (2), a modular oxidant supply system (3), a modular cooling system (4), a power transmission and inverter system (5), and a power station master system (6), wherein the distributed cell stack module (1) is a power station core power generation device, the modular fuel supply system (2) serves as a fuel supply system for the distributed cell stack module (1), and the modular oxidant supply system (3) serves as an oxidant supply system for the distributed cell stack module (1) the modular cooling system (4) performs cooling and heat exchange of the distributed cell stack module (1), the power transmission and inverter system (5) converts, transmits and allocates a power of the distributed cell stack module (1), and the power station master system (6) controls and manages each of the systems and the modules, wherein the distributed cell stack module (1) is formed by connecting a first cell stack module, a second cell stack module and an Nth cell stack module, and each of the cell stack modules is formed by connecting N single cell stacks (7); the modular fuel supply system (2) comprises a low-pressure fuel buffer storage tank (V230), the low-pressure fuel buffer storage tank (V230) is connected to a fuel supply main pipe (PL270), and the fuel supply main pipe (PL270) is connected with main fuel inlets and main fuel outlets of the first cell stack module, the second cell stack module and the Nth cell stack module of the distributed cell stack module (1) through a first branch fuel supply branch pipe (PL273), a first branch fuel discharge branch pipe (PL274), a second branch fuel supply branch pipe (PL275), a second branch fuel discharge branch pipe (PL276), an Nth branch fuel supply branch pipe and an Nth branch fuel discharge branch pipe respectively, wherein the modular fuel supply system (2) further comprises a nitrogen storage tank (V231) and a fuel collection storage tank (V232); the nitrogen storage tank (V231) is connected with a nitrogen supply main pipe (PL271), and the fuel collection storage tank (V232) is connected with a fuel collection main pipe (PL272); the nitrogen supply main pipe (PL271) and the fuel collection main pipe (PL272) are connected with a second air outlet of a first water-gas separator (V233), a second air outlet of a second water-gas separator (V234) and an Nth water-gas separator respectively after being connected with each other; a first air outlet of the first water-gas separator (V233) is connected with a first fuel circulation pump (M290), the first fuel circulation pump (M290) is connected with the first branch fuel supply branch pipe (PL273), and an air inlet of the first water-gas separator (V233) is connected with the first branch fuel discharge branch pipe (PL274); a first air outlet of the second water-gas separator (V234) is connected with a second fuel circulation pump (M291), the second fuel circulation pump (M291) is connected with the second branch fuel supply branch pipe (PL275), and an air inlet of the second water-gas separator (V234) is connected with the second branch fuel discharge branch pipe (PL276); the fuel supply main pipe (PL270) is cooperatively provided with a first pressure gauge (P210), a first stop valve (J201), a first adjustment valve (T240), and a first safety valve (A260); the fuel supply main pipe (PL270) is connected with the first branch fuel supply branch pipe (PL273), the first branch fuel discharge branch pipe (PL274), the second branch fuel supply branch pipe (PL275), the second branch fuel discharge branch pipe (PL276), the Nth branch fuel supply branch pipe and the Nth branch fuel discharge branch pipe through a first injection valve (S280), a second injection valve (S281) and an Nth injection valve respectively; the nitrogen supply main pipe (PL271) is cooperatively provided with a second pressure gauge (P211), a second stop valve (J202) and a second adjustment valve (T241); the fuel collection main pipe (PL272) is cooperatively provided with a third pressure gauge (P212), a third stop valve (J203) and a third adjustment valve (T242); a second air outlet of the first water-gas separator (V233) is connected with a third electric control valve (Q222) and a fourth electric control valve (Q223); a second air outlet of the second water-gas separator (V234) is connected with a seventh electric control valve (Q226) and an eighth electric control valve (Q227); the first fuel circulation pump (M290) is connected with a fourth adjustment valve (T243) and a first flow meter (L250) on the first branch fuel supply branch pipe (PL273), the other end of the fourth adjustment valve (T243) is connected with the first injection valve (S280), the other end of the first flow meter (L250) is connected with the first electric control valve (Q220), and the first electric control valve (Q220) is connected with the first cell stack module of the distributed cell stack module (1); the second fuel circulation pump (M291) is connected with a fifth adjustment valve (T244) and a second flow meter (L251) on the second branch fuel supply branch pipe (PL275), the other end of the fifth adjustment valve (T244) is connected with the second injection valve (S281), the other end of the second flow meter (L251) is connected with a fifth electric control valve (Q224), and the fifth electric control valve (Q224) is connected with the second cell stack module of the distributed cell stack module (1).

2. The large-scale proton exchange membrane fuel cell power station process system according to claim 1, wherein the modular oxidant supply system (3) comprises an air buffer heat exchanger (V352), the air buffer heat exchanger (V352) is connected with an air compressor (M360), and an air outlet of the air buffer heat exchanger (V352) is connected with an air inlet main pipe (PL305); the air inlet main pipe (PL305) is connected with main air inlets of the first cell stack module, the second cell stack module and the Nth cell stack module of the distributed cell stack module (1) through a first air inlet branch pipe (PL301), a second air inlet branch pipe (PL303) and an Nth air inlet branch pipe respectively, and main air outlets of the first cell stack module, the second cell stack module and the Nth cell stack module of the distributed cell stack module (1) are connected with an exhaust main pipe (PL306) through a first air outlet branch pipe (PL302), a second air outlet branch pipe (PL304), an Nth air outlet branch pipe respectively; the exhaust main pipe (PL306) is connected with an air inlet of a third gas-water separator (V351), and a first air outlet of the third gas-water separator (V351) is connected with a water collection container (V354).

3. The large-scale proton exchange membrane fuel cell power station process system according to claim 1, wherein the power transmission and inverter system (5) comprises a DC/DC conversion device (U510), the DC/DC conversion device (U510) is connected with an inverter system (T520), the inverter system (T520) is connected with a first transformer (T522), and the first transformer (T522) merges an alternating current into a utility power main line; the first transformer (T522) is cooperatively connected with a second transformer (T521), and the second transformer (T521) is connected with the power station master system (6).

4. The large-scale proton exchange membrane fuel cell power station process system according to claim 1, wherein the single cell stack (7) is press-fitted by servo pressure and sealing with a pressure plate (701), an upper end plate (702), an upper insulation plate (703), an upper current collector (704), an anode blind plate (706), a single battery pack formed by connecting N single cells (8), a cathode blind plate (708), a lower current collector (709), a lower insulation plate (712) and a lower end plate (713) that are arranged in sequence; the upper current collector (704) is provided with an upper carbon paper (705), and the lower current plate (710) is provided with a lower carbon paper (711); a side of the anode blind plate (706) is provided with an anode current field (707), and a side of the cathode blind plate (708) is provided with a cathode current field (709).

5. The large-scale proton exchange membrane fuel cell power station process system according to claim 2, wherein the modular oxidant supply system (3) further comprises an air humidifier (V353) and an air filter (V350); an end of the air humidifier (V353) is connected with the air buffer heat exchanger (V352) and the air inlet of the third gas-water separator (V351) through a first pipeline, and the other end of the air humidifier (V353) is connected with the air inlet main pipe (PL305) and the exhaust main pipe (PL306); the air compressor (M360) is connected with the air filter (V350) through a second pipeline, and the second pipeline is provided with a third flow meter (L330) and a sixth adjustment valve (T340); the first air inlet branch pipe (PL301) is cooperatively provided with a fourth flow meter (L331) and a seventh adjustment valve (T341), and the second air inlet branch pipe (PL303) is cooperatively provided with a fifth flow meter (L332) and an eighth adjustment valve (T342); the first air outlet branch pipe (PL302) is cooperatively provided with a ninth electric control valve (Q320), and the second air outlet branch pipe (PL304) is cooperatively provided with a tenth electric control valve (Q321); a third pipeline connected between the first air outlet of the third gas-water separator (V351) and the water collection container (V354) is provided with an eleventh electric control valve (Q322), and the second air outlet of the third gas-water separator (V351) is connected with a twelfth electric control valve (Q323).

6. The large-scale proton exchange membrane fuel cell power station process system according to claim 4, wherein the single cell (8) is formed by a bipolar plate (801) and membrane electrodes (802) symmetrically arranged on both sides of the bipolar plate; the membrane electrode (802) comprises a proton exchange membrane (802a), both sides of the proton exchange membrane (802a) are symmetrically provided with catalyst layers (802b), both sides of the catalyst layer (802b) are symmetrically provided with gas diffusion layers (802c), and the gas diffusion layers (802c) on both sides are sealed and combined with the bipolar plates (801) on both sides to form the single cell; the single cell stack (7) is provided with a voltage inspection plate (714), a fuel runner inlet (715), a coolant inlet (716), an oxidant runner inlet (717), a fuel runner outlet (718), a coolant outlet (719) and an oxidant runner outlet (720), and the voltage inspection plate (714) is controllably connected with the power station master system (6).

7. The large-scale proton exchange membrane fuel cell power station process system according to claim 5, wherein the modular cooling system (4) comprises a coolant water container (V481), a circulating water cooling device (V480) cooperatively connected with the coolant water container, and a pure water processing device (V482); a water delivery main pipe (PL406) of the coolant water container (V481) is connected with main water inlets of the first cell stack module, the second cell stack module and the Nth cell stack module of the distributed cell stack module (1) through a first cooling water inlet branch pipe (PL401), a second cooling water inlet branch pipe (PL403) and an Nth cooling water inlet branch pipe respectively, and a water return main pipe (PL405) the coolant water container (V481) is connected with main water outlets of the first cell stack module, the second cell stack module and the Nth cell stack module of the distributed cell stack module (1) through a first water outlet branch pipe (PL402), a second water outlet branch pipe (PL404) and an Nth water outlet branch pipe respectively; the pure water processing device (V482) is cooperatively connected with the water collection container (V354) of the modular oxidant supply system (3) through a water replenish pipe (PL407).

8. The large-scale proton exchange membrane fuel cell power station process system according to claim 6, wherein the water delivery main pipe (PL406) is cooperatively provided with a fifteenth electric control valve (Q462), a circulating water pump (M471) and a twelfth adjustment valve (T452), the first cooling water inlet branch pipe (PL401) is cooperatively provided with the tenth adjustment valve (T450), and the second cooling water inlet branch pipe (PL403) is cooperatively provided with the eleventh adjustment valve (T451); a first water outlet branch pipe (PL402) is cooperatively provided with a thirteenth electric control valve (Q460), and the second water outlet branch pipe (PL404) is cooperatively provided with a fourteenth electric control valve (Q461); the coolant water container (V481) is connected with a water return port of the air buffer heat exchanger (V352) of the modular oxidant supply system (3) through a heat exchanger water return pipe (PL406), an water inlet of the air buffer heat exchanger (V352) is connected with the thirteenth adjustment valve (T453), and the thirteenth adjustment valve (T453) is connected with the circulating water pump (M471) and the twelfth adjustment valve (T452) through first pipelines respectively; a second pipeline connected between the coolant water container (V481) and the circulating water cooling device (V480) is provided with an external circulating water pump (M470), the coolant water container (V481) is connected with an inlet pipeline of the pure water processing device (V482) through a sixteenth electric control valve (Q463) and a seventeenth electric control valve (Q464), and the water replenish pipe (PL407) of the pure water processing device (V482) is cooperatively provided with an eighteenth electric control valve (Q465), a delivery pump (M472), a stop valve (J401) and a check valve (Z490).

\* \* \* \* \*